United States Patent
Gessaman

(10) Patent No.: US 7,051,746 B2
(45) Date of Patent: May 30, 2006

(54) VALVE HAVING PRESSURE BALANCING PISTON AND METHOD INVOLVING SAME

(75) Inventor: Jeff A. Gessaman, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

(21) Appl. No.: 11/191,098

(22) Filed: Jul. 27, 2005

(65) Prior Publication Data

US 2005/0279959 A1  Dec. 22, 2005

Related U.S. Application Data

(62) Division of application No. 10/695,403, filed on Oct. 28, 2003, now Pat. No. 7,000,895.

(60) Provisional application No. 60/423,033, filed on Nov. 1, 2002.

(51) Int. Cl.
*F16K 39/00* (2006.01)

(52) U.S. Cl. .......................... 137/14; 251/282

(58) Field of Classification Search ................ 251/281, 251/282; 137/14
See application file for complete search history.

(56) References Cited

U.S. PATENT DOCUMENTS

| | | | |
|---|---|---|---|
| 2,758,812 A | * | 8/1956 | Marcy et al. ................. 251/44 |
| 2,897,836 A | | 8/1959 | Peters et al. |
| 3,318,577 A | | 5/1967 | Banks |
| 4,341,370 A | | 7/1982 | Banks |
| 5,086,808 A | * | 2/1992 | Pettus ..................... 137/625.3 |
| 5,386,965 A | | 2/1995 | Marchal |

FOREIGN PATENT DOCUMENTS

DE  1084537  6/1960

OTHER PUBLICATIONS

Drawing depicting Inventor's general understanding or representation of the present state of the art prior to the invention; this drawing appeared in the papers filed in the corresponding provisional application.

* cited by examiner

*Primary Examiner*—J. Casimer Jacyna
(74) *Attorney, Agent, or Firm*—Reinhart Boerner Van Deuren P.C.

(57) ABSTRACT

A valve assembly is disclosed that provides for complete or partial fluid pressure balancing across the valve, and can be used for reducing valve actuation forces in order to employ electric actuation. The valve assembly includes a valve housing having a valve chamber, a flow passageway, and a piston chamber. A valve member is disposed in the valve housing and is movable along a valve axis. The valve member is subjected to a first pressure, which urges the valve in a first direction. To counteract this force, a piston integral with the valve member is slidably arranged in the piston chamber. One side of the piston is subjected to this first pressure to provide a counterbalancing force. A pressure passage fluid communication of the first pressure between the flow passageway and said one side of the piston.

17 Claims, 3 Drawing Sheets

VALVE HAVING PRESSURE BALANCING PISTON AND METHOD INVOLVING SAME

CROSS-REFERENCE TO RELATED PATENT APPLICATIONS

This patent application is a divisional of U.S. patent application Ser. No. 10/695,403, filed on Oct. 28, 2003, now U.S. Pat. No. 7,000,895 which claims the benefit of U.S. Provisional Patent Application No. 60/423,033, filed Nov. 1, 2002, the entire disclosures of which are hereby incorporated by reference.

FIELD OF THE INVENTION

This invention pertains to valves and more particularly to apparatus and methods for balancing fluid pressures across valves.

BACKGROUND OF THE INVENTION

Plug valves are typically known to place high forces on the actuator. This is due to fluid pressure acting on the end face of the plug. Some valves will incorporate a passage that is drilled from the nose of the plug to an internal cavity. Pressure in this internal cavity acts on a shoulder on the valve between the plug portion and the stem portion to force the plug in the downward direction, partially counteracting the forces acting on the plug end face that push the valve upward. The working area of this shoulder is equal to the working area of the plug face minus the area of the valve stem. Therefore, the working area occupied by the valve stem prevents complete pressure balancing across the valve and only provides for partial balancing, which in turn requires higher actuator force to achieve performance requirements and/or results in lower dynamic response. Creating a very small valve stem can reduce the actuator force required. However, the stem must be large enough to transmit the required actuator loads with margin.

In applications that require quick response, plug valves have historically been actuated by hydraulic actuators. Hydraulic actuation provides a high power density that is not achievable with electric actuation. Along with hydraulic actuation, however, one also unfortunately gets oil leaks, fire concerns, filtering requirements, oil piping, and a costly hydraulic power unit. Such hydraulic power units may cost in excess of $50,000 in certain gas turbine applications.

Electric actuation has typically been reserved for low power applications: high force at low speeds or low force at high speeds. However, a large number of applications do not fall in these categories as end users define valve operating pressures and dynamic response requirements, which in turn requires the more costly hydraulic actuation. Reduction of plug valve actuation forces is necessary to economically applying electric actuators on high performance applications, such as valves for turbine fuel metering. Accordingly, there is a desire and need to reduce valve actuation force and/or increase dynamic valve response in the art.

BRIEF SUMMARY OF THE INVENTION

The present invention is directed toward a valve assembly that can provide for pressure balancing across the valve, which can be used for example, for reducing valve actuation forces or increasing dynamic response, or both, or for any other suitable purpose (e.g. counteracting flow forces, etc.). The valve assembly includes a valve housing having a valve chamber, a flow passageway extending through the valve chamber, and a piston chamber. A valve member is disposed in the valve housing and is movable along a valve axis. The valve member has a plug portion arranged along the flow passageway for regulating fluid flow. The plug portion is subjected to a first fluid pressure from the flow passageway that urges the valve in a first direction. To counteract this force, a piston integral with the valve member is slidably arranged in the piston chamber. The piston has a first side subjected to this first fluid pressure urging the valve in a second direction opposite said first direction. A second side of the piston is subjected to a second fluid pressure which may be lower (e.g. atmospheric pressure) that urges the valve in the opposing first direction. A pressure passage is provide to communicate fluid pressure between the first side of the piston and the valve plug portion to subject the first side of the piston to the first pressure.

The present invention is also directed toward a method of balancing fluid forces across a plug valve that comprises:
  regulating a flow of fluid along a flow passageway with a valve member, the valve member including a plug member that is adapted to restrict flow and a valve stem, the fluid acting upon the plug member and being at a first pressure to provide a first force urging the valve member in a first direction;
  actuating the valve stem to drive the valve member;
  counteracting at least part of the first force with a second force generated by a piston integral with the valve member and slidable in a piston chamber, the piston having a first side subjected to the first pressure and a second side vented to ambient; and
  communicating the first pressure from the flow passageway to the piston chamber on the first side.

Other aspects, objectives and advantages of the invention will become more apparent from the following detailed description when taken in conjunction with the accompanying drawings.

DETAILED DESCRIPTION OF THE INVENTION

Figure 1:
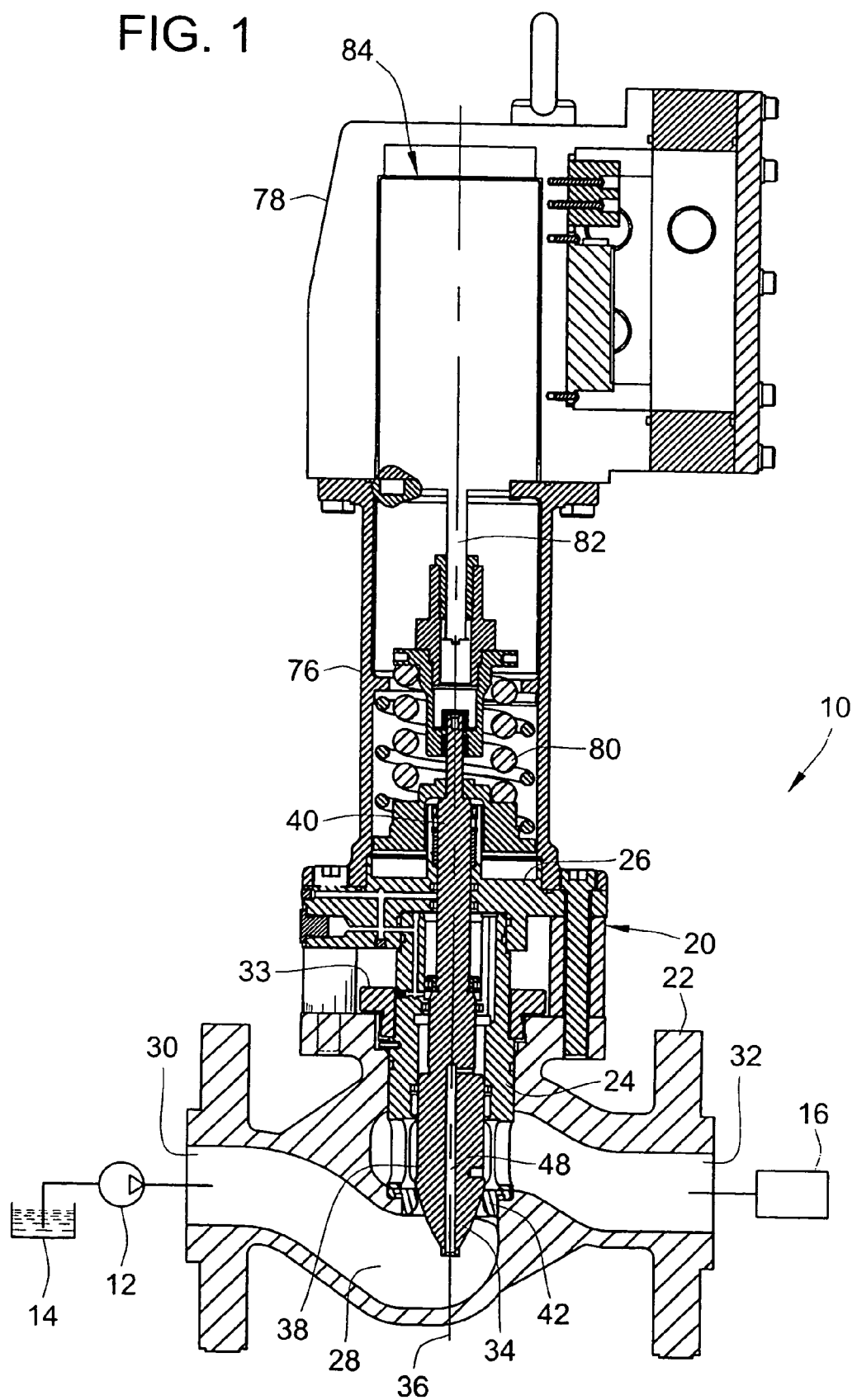
FIG. 1 is a cross section of a valve assembly in accordance with an embodiment of the present invention, with a fuel metering application being indicated schematically.

Referring to FIG. 1, an embodiment of the present invention has been illustrated as an electrically actuated valve assembly 10. An application or example working environment schematically shown in FIG. 1 is metering fuel flow in a turbine engine. As schematically illustrated for this application, a pump 12 pressurizes and pumps fuel (which may either be gaseous fuel or liquid fuel) from a fuel storage tank 14 to the turbine engine 16. The valve assembly 10 is interposed therebetween for controlling fuel flow to the engine 16.

The valve assembly 10 includes a valve housing 20 that is adapted to pass the fluid to be regulated and provides the fluid chambers used for effecting the present invention. In the disclosed embodiment, the valve housing comprises a valve body 22, a generally cylindrical valve cage 24, and a valve bonnet 26, however, it will be appreciated that other valve housing arrangements can be used as appropriate. In the illustrated embodiment, the valve body 26 defines a flow passageway 28 with inlet and outlet ports 30, 32. Fuel or other appropriate fluid depending upon the application flows through the passageway 28 during operation, typically in one direction from the inlet port 30 to the outlet port 32. The valve cage 24 is mounted to the valve body 26 by a threaded retaining collar 33 screwed to valve body to provide a valve chamber along the flow passageway 28. The valve bonnet 26 is bolted onto the valve body 26 with spacers and provides a cylindrical bore for guiding valve stroke.

Figure 3:
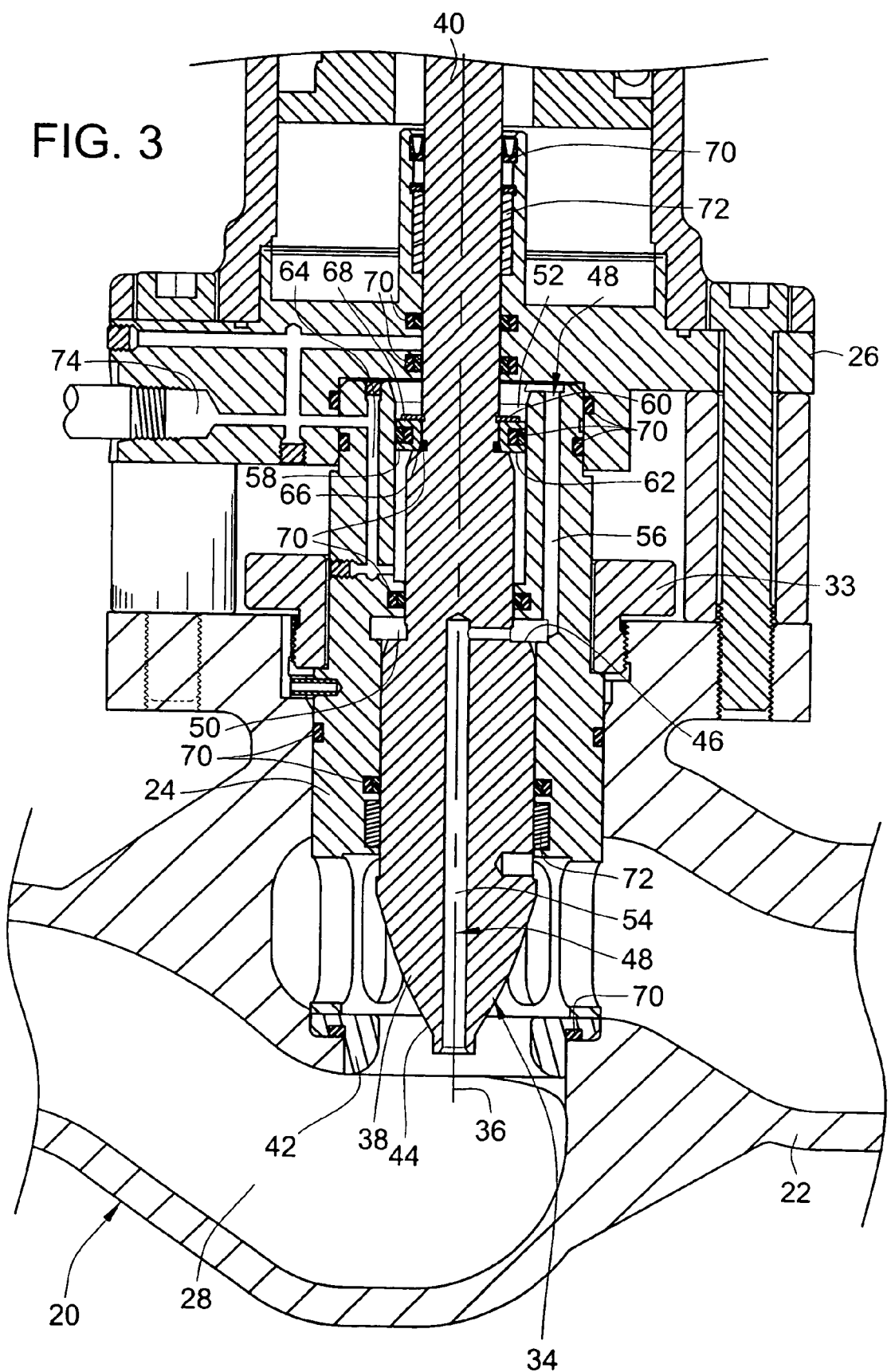
FIG. 3 is cross section similar to FIG. 2, but with the valve shown in an open position.

The valve assembly 10 also includes a movable and generally cylindrical valve member 34 that is mounted for linear reciprocation in the valve housing 20. The valve member 34 includes a plug portion 38 for providing flow regulation and a stem portion 40 extending axially from the plug portion. The stem and plug portions may be formed as a unitary component or as separate component parts that may be secured together. The stem portion 40 extends from the valve housing 20 in order to be acted upon by a suitable actuator for positioning the plug portion 38 to regulate flow. The valve member 34 is movable toward and away from a ring shaped valve seat 42. The valve seat 42 is provided in the valve housing 20 between the valve body 22 and the valve cage 24 in a location that is coaxial about the valve axis 36 and that surrounds the flow passageway 28. In the disclosed embodiment, the valve member has a fully open position as shown in FIG. 3, and a fully closed position in which the plug portion 38 is seated against the valve seat 42, and may include various intermediate positions therebetween. It should be noted that in the disclosed embodiment the fully open position as shown in FIG. 3 is not set by virtue of the valve member bottoming out, but is set externally through the actuator that includes a limit to limit how open the valve member can move. Thus, for all operating positions of the valve, an internal pressure passage 48, the significance of which is herein described, remains continuously open in the disclosed embodiment.

Figure 2:
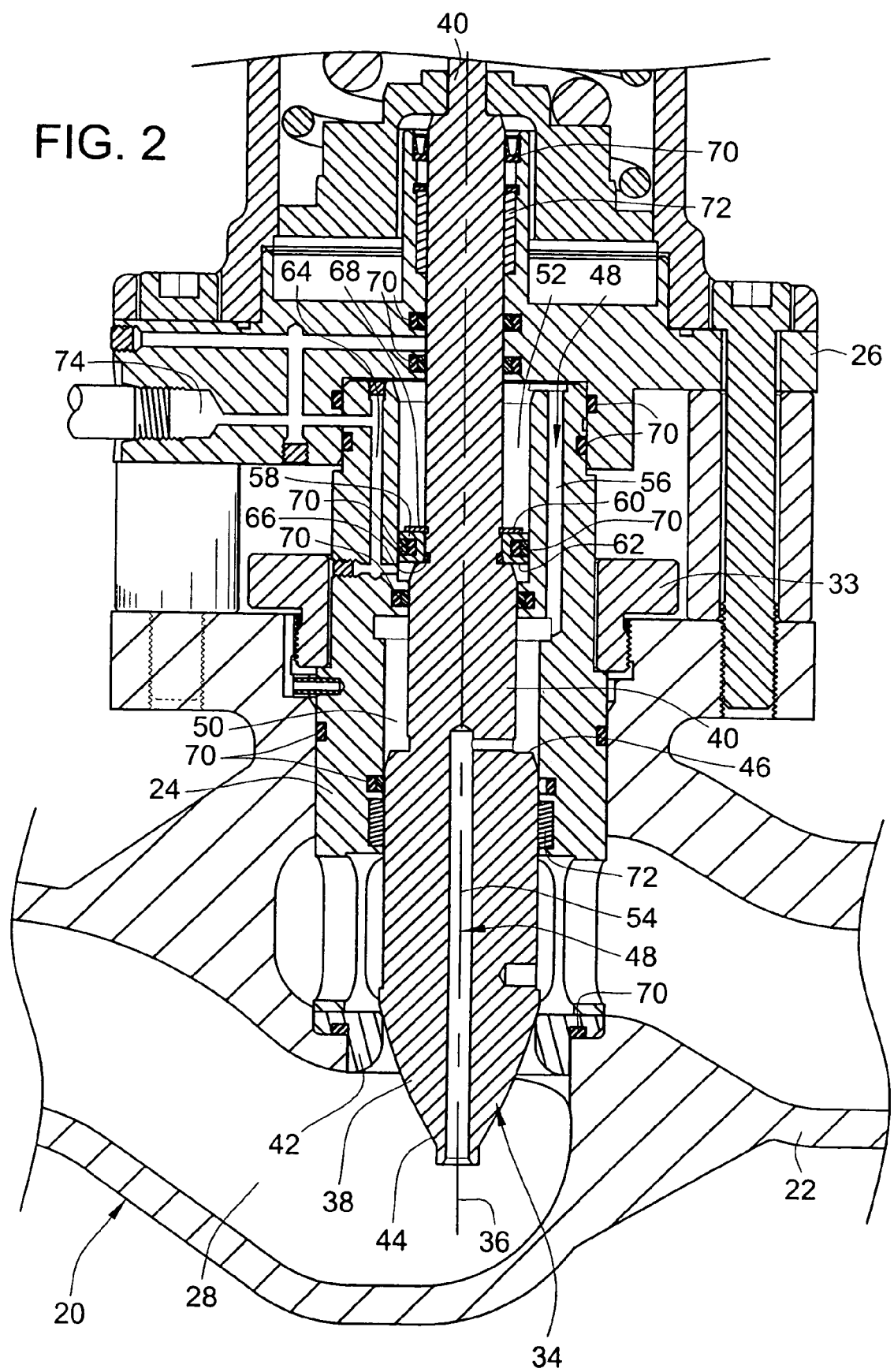
FIG. 2 is an enlarged portion of the cross section of the valve assembly shown in FIG. 1, with the valve illustrated in a closed position.

As shown in FIG. 2, the valve member 34 may include several sections of different diameters along its axial length. The plug portion 38 includes a cylindrical section with a cone shaped nose that provides a radially extending end face 44 and is adapted to seat against the valve seat 42. The stem portion 40 may be of a reduced diameter relative to the plug portion 38 to provide a radially extending shoulder 46 that is adapted to be acted upon by fluid pressure. The stem portion 40 may also be stepped to include additional different diameter portions as shown.

Since the end face 44 of the plug portion 38 is exposed to the flow passageway 28, during operation it is subjected to the fluid pressure of the fluid in the passageway 28 (which is typically higher than ambient). In the case of high pressure gaseous fuel or pumped liquid fuel in the disclosed example application, this pressure can be much higher than ambient. Fluid pressure creates an axial force on the valve member 34 that urges the valve member 34 in a first direction (e.g. upward in the orientation provided), which in the disclosed embodiment is toward the open position (although it may also be urged closed under vacuum pressure conditions or alternatively be configured to be urged toward the closed position). To counteract this pressure induced force, this pressure is ported along a pressure passage 48 to the other side of the valve plug portion 38. Specifically, the pressure passage 48 ports the pressure experienced at the end face 44 into an intermediate chamber 50 defined between the valve stem portion 42 and the valve cage 24, and also into the opposite end of a piston chamber 52, which may also be defined by the valve cage 24. In the preferred embodiment as illustrated, the pressure passage 48 includes a first axially extending passage segment 54 formed through the movable valve member 34 and second axially extending passage segment formed through the cage 26 of the valve housing 20. However, it will be appreciated that the pressure passage 48 may be provided entirely through the movable valve member 34 or entirely through the valve housing 20 if desired in alternative embodiments of the present invention.

The fluid pressure that is ported to the intermediate chamber 50 acts upon the working face that is provided by the annular shoulder 46 at the intersection of the valve stem portion 40 and the valve plug portion 38. This provides an axial force opposite the force generated by fluid pressure on the plug end face 44 and partially counterbalances the fluid pressure forces across the valve member 34. However, the effective working area of the annular shoulder 46 is less than the working area of the plug end face 44 due to the space occupied by the valve stem portion 40. The valve stem 40 projects axially and externally from the valve housing 20 and is therefore subjected to atmospheric fluid pressure (in addition to actuator and/or spring force when applied). Accordingly, because the fluid pressure at the plug end face 44 is typically substantially greater than atmospheric, the provision of the intermediate chamber 50 and the annular shoulder 46 is only partially effective in achieving the desired effect.

To provide for a more complete balancing, the disclosed embodiment includes a piston 58 integral with the valve member 34 that includes a first side 60 subjected to the fluid pressure experienced at the plug end face 44, and a second side 62 subjected to a second pressure. In the illustrated embodiment this second pressure along the second side 62 of the piston is atmospheric pressure by virtue of a vent passage 64 that vents the lower part of the piston chamber 52 to ambient as a matter of simplicity for the disclosed application, although other pressures are possible (e.g. tank or sump pressure).

With this arrangement, the fluid pressure experienced at the plug end face 44 acts upon the first side 60 of the piston 58 urging the valve member 34 in a second opposite direction. This provides an axial force on the valve member 34 independent of the pressure applied at the shoulder 46 due to the fact that a pressure differential exists across the piston 58 by virtue of the second side 62 of the piston 58 being exposed to a different pressure. Therefore, an alternative embodiment of the present invention may eliminate the intermediate chamber 50 and the fluid pressure applied along the shoulder 46. However, in the disclosed embodiment the piston 58 compliments the shoulder 46 and serves the purpose of offsetting or counterbalancing the working area occupied by the valve stem portion 40. The effective working area of the of the first side 60 of the piston 58 may therefore be about equal to the largest diameter of the stem portion 40. If desired, a difference in working areas may be provided to substantially balance the valve while at the same time, providing a slight bias on the valve such as to maintain the valve in a closed (or open) position upon power loss, or to provide a force to counteract other flow forces or to balance spring forces, or for any such suitable balancing purpose. With the provision of the piston 58, however, the fluid pressure forces can more easily be controlled across the valve member 34 to provide a desired performance characteristic which has not been achieved in the prior art, such as reducing actuator force and/or improving dynamic performance.

The integral piston 58 can either be unitarily formed into the valve stem portion 40, or as shown may be a separate component part secured to the valve member. In the disclosed embodiment, the piston 58 is a separate ring shaped component with a central hole such that it is that is concentrically slid onto the valve stem portion 42 and secured thereon by a retaining mechanism. The retaining mechanism used in the disclosed embodiment is the combination of a shoulder 66 formed at a step in the stem portion 40 and a snap ring 68 that is installed into a groove on the valve stem portion 40. However, it will be appreciated that other integral connectors may be used such as a threaded connection, welding and the like that cause the piston to move with the valve member 34.

Dynamic or static ring seals 70 as illustrated are strategically located in seal retaining grooves throughout the valve assembly 10 to provide sealing and to prevent passage of fluid between component parts. The operation of such seals will readily be appreciated by one of ordinary skill in the art upon viewing the drawings, and accordingly further description is not provided herein for purposes of brevity. However, it should be noted that if leakage were to occur past any one of many of the seals 70 (particularly dynamic seals which are more prone to wear), such leakage paths lead to a common fugitive emission collection passage which happens to coincide with the piston chamber vent passage 64. This is particularly advantageous for gaseous fuels for which leakage problems may be hard to detect. The vent passage 64 leads to a fugitive emission port 74 that may be subjected to atmospheric pressure. The port 74 may be connected to a filter or screen to avoid plugging or dirt ingress, or for gaseous fuel applications an exhaust line leading to a remote safe exhaust port location for fugitive gas emissions, sensor equipment, or other apparatus.

Also, cylindrical wear rings/bushings 72 supported by the valve housing 20 are also provided in spaced axial relation along the valve member 34 to guide sliding movement of the valve member 34.

The electrically actuated valve assembly 10 may also include as part of an overall support housing, not only the valve housing 20, but also a spring housing 76 and an actuator housing 78, as shown in FIG. 1. In an alternative embodiment, these structural components parts may not be needed or may also be integrated into the valve housing 20 which provides the various fluid chambers if desired. In the disclosed embodiment, the spring housing 76 is mounted between the actuator housing 78 and the valve housing 20. The valve stem portion 40 extends through the valve bonnet 26 into the spring housing 76. Here the stem portion 40 may be biased by one or more springs 80 (e.g. it may be biased toward a closed, an open position, or may be unbiased), and is subjected to the driving force output 82 of an electrical actuator 84 contained in the actuator housing 78.

An advantage that can be realized using the pressure balancing aspects of the present invention is that a lower power electrical actuator 84 may be used and/or dynamic performance can be increased. The piston 58 can be used to effectively reduce the pressure imbalance that would otherwise occur absent the piston 58 and if only partial counterbalance was provided via the pressure in intermediate chamber 50 acting upon shoulder 46. Although significant advantages are realized for electrical actuation applications, it will be appreciated that the invention may also be employed with other types of actuators including hydraulic actuation where an increase in dynamic performance or decrease in actuation force is desired or for other appropriate purposes. As applied to the disclosed exemplary application, large stroke forces are not required to move the valve member 34 with the pressure balancing characteristics afforded by the piston 58, and therefore electrical actuation provided by an electrical actuator 84 can be used for many applications that previously used hydraulic actuation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of balancing fluid forces across a plug valve comprising the steps of:

regulating a flow of fluid along a flow passageway with a valve member, the valve member including a plug portion that is adapted to restrict flow and a valve stem, the fluid acting upon the plug portion and being at a first pressure to provide a first force urging the valve member in a first direction;

actuating the valve stem to drive the valve member;

counteracting at least part of the first force with a second force generated by a piston integral with the valve member and slidable in a piston chamber, the piston having a first side subjected to the first pressure and a second side vented to ambient;

communicating the first pressure from the flow passageway to the piston chamber on the first side; and porting the first pressure to a radially extending working surface of the valve member, the first pressure acting upon the radially extending working surface separate from the piston to urge the valve member in a second direction opposite said first direction to further counteract said first force.

2. The method of claim 1 wherein the step of actuating the valve stem comprises electrically actuating with an electrical actuator driving the valve member.

3. The method of claim 1 wherein the first pressure applied to the first side urges the valve member in the second direction.

4. The method of claim 1 further comprising the step of metering fuel flow in a turbine engine along the flow passageway with the plug portion.

5. The method of claim 1 wherein the step of porting the first pressure is conducted at least in part through an internal passage in the valve member and at least in part through a housing slidably engaging the valve member.

6. The method of claim 5 wherein the internal passage in the valve member is located in part along a radial axis of the valve member.

7. The method of claim 5 wherein the internal passage in the valve member is continually open.

8. The method of claim 1 further comprising the step of providing a leakage path to a common fugitive collection passage.

9. The method of claim 1 wherein the step of actuating the valve stem to drive the valve member comprises actuating the valve stem to drive the valve member at a lower stroke force than the stroke force that is required to drive the valve member without counteracting at least part of the first force with the second force.

10. A method of improving dynamic performance of a plug valve that regulates flow of fluid along a flow passageway with a valve member, the valve member including a plug portion that is adapted to restrict flow and a valve stem, the fluid acting upon the plug portion and being at a first pressure to provide a first force urging the valve member in a first direction, the method further comprising the steps of:
   actuating the valve stem to drive the valve member;
   counteracting at least part of the first force with a second force generated by a piston integral with the valve member and slidable in a piston chamber, the piston having a first side subjected to the first pressure and a second side vented to ambient;
   communicating the first pressure from the flow passageway to the piston chamber on the first side; and
   porting the first pressure to a radially extending working surface of the valve member, the first pressure acting upon the radially extending working surface separate from the piston to urge the valve member in a second direction opposite said first direction to further counteract said first force.

11. The method of claim 10 wherein the first pressure applied to the first side urges the valve member in the second direction.

12. The method of claim 10 further comprising the step of metering fuel flow in a turbine engine along the flow passageway with the plug portion.

13. A method of balancing fluid forces across a plug valve and improving dynamic performance of the plug valve, the method comprising the steps of:
   regulating a flow of fluid along a flow passageway with a valve member, the valve member including a plug portion that is adapted to restrict flow and a valve stem, the fluid acting upon the plug portion and being at a first pressure to provide a first force urging the valve member in a first direction;
   actuating the valve stem to drive the valve member;
   counteracting at least part of the first force with a second force generated by a piston integral with the valve member and slidable in a piston chamber, the piston having a first side subjected to the first pressure and a second side vented to ambient;
   communicating the first pressure from the flow passageway to the piston chamber on the first side; and
   porting the first pressure to a radially extending working surface of the valve member, the first pressure acting upon the radially extending working surface separate from the piston to urge the valve member in a second direction opposite said first direction to further counteract said first force, thereby improving dynamic performance of the plug valve.

14. The method of claim 13 wherein the steps of counteracting at least part of the first force with the second force and communicating the first pressure from the flow passageway to the piston chamber on the first side provides the capability to drive the valve member at a lower stroke force than the stroke force that is required to drive the valve member without counteracting at least part of the first force with the second force.

15. The method of claim 13 wherein the first pressure applied to the first side urges the valve member in the second direction.

16. The method of claim 13 wherein the step of porting the first pressure is conducted at least in part through an internal passage in the valve member and at least in part through a housing slidably engaging the valve member.

17. The method of claim 13 further comprising the step of providing a leakage path to a common fugitive collection passage.

* * * * *

UNITED STATES PATENT AND TRADEMARK OFFICE
CERTIFICATE OF CORRECTION

| | | |
|---|---|---|
| PATENT NO. | : 7,051,746 B2 | Page 1 of 1 |
| APPLICATION NO. | : 11/191098 | |
| DATED | : May 30, 2006 | |
| INVENTOR(S) | : Jeff A. Gessaman | |

It is certified that error appears in the above-identified patent and that said Letters Patent is hereby corrected as shown below:

Column 7, Line 37, for the claim reference numeral 10, delete "further".

Signed and Sealed this

Eighth Day of August, 2006

JON W. DUDAS
*Director of the United States Patent and Trademark Office*